F. W. HAWKINS.
Rake.
No. 164,450.                           Patented June 15, 1875.
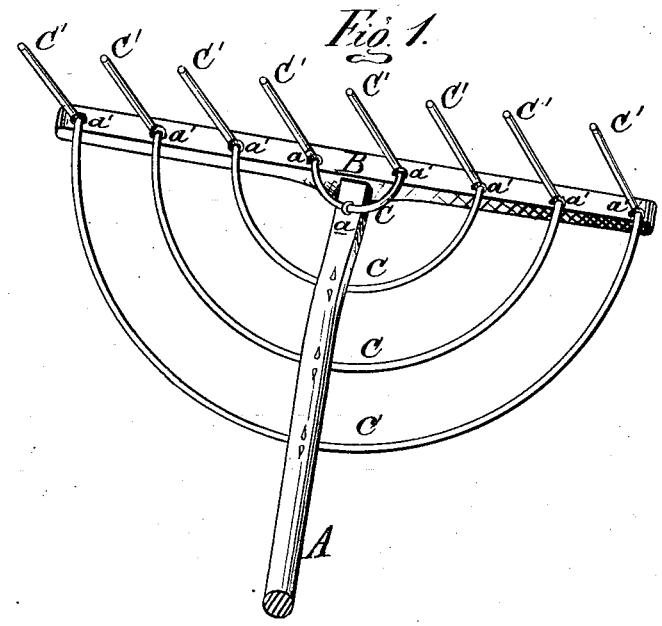
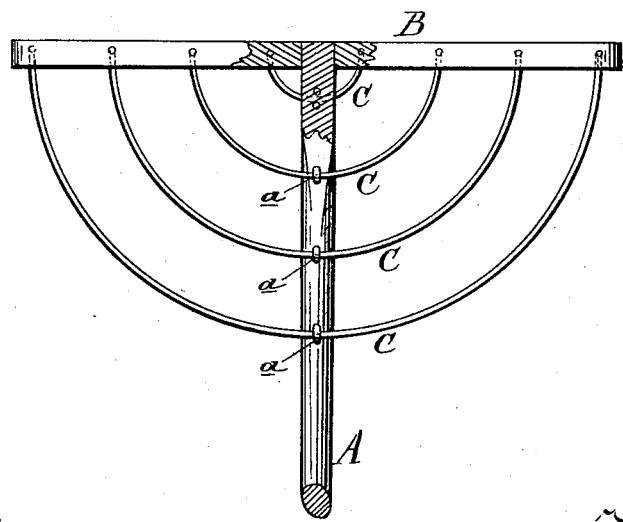

UNITED STATES PATENT OFFICE.

FREDERICK W. HAWKINS, OF YPSILANTI, MICHIGAN.

IMPROVEMENT IN RAKES.

Specification forming part of Letters Patent No. 164,450, dated June 15, 1875; application filed October 1, 1874.

*To all whom it may concern:*

Be it known that I, FREDERICK W. HAWKINS, of Ypsilanti, in the county of Washtenaw and State of Michigan, have invented an Improvement in Field and Garden Rakes, of which the following is a specification:

The nature of this invention relates to an improvement in field and garden rakes; and consists in the peculiar construction and combination of the rake-head, handle-braces and teeth, and their fastenings, as more fully hereinafter set forth.

Figure 1 is a bottom perspective view. Fig. 2 is a partial top plan, showing the tenon of the handle and the mortise of the head in a horizontal section.

In the drawing, A represents the handle, and B the head, of the rake mortised to receive the tenon of the handle, which is inserted therein, but not pinned fast. C are the braces, each made of steel wire bent into semicircles of the various diameters required. Each end of each brace is bent down at a right angle with the body thereof to form a tooth, C'. The wires are cut of such length as that each brace will be a half circle between the angles of the teeth.

The rake I generally make of four braces and pairs of teeth. The three longer braces I lay on top of the handle, and secure them thereto by a staple, $a$, driven through the handle, each straddling a brace while its inner ends are turned over and clinched on the under side of the handle. The smaller or central brace I secure in like manner to the under side of the handle. The ends of all the braces are embraced by staples $a'$ driven up into the under side of the head, and clinched to the top thereof, but in such a manner as to allow the braces to play freely in said staples so that the strain on any tooth does not come upon the head, but upon the handle at the point where its brace is fastened thereto.

I am aware that the broad idea of forming teeth and a brace of one single piece of wire is not new, and, therefore, do not claim this feature; but What I do claim, and desire to secure by Letters Patent, is—

In combination with handle A, and head B, the braces C C, bent as described, and secured by means of staples $a$ $a'$, the braces nearest the head being secured to the under side of the handle, while the remaining ones are fastened to the upper side thereof, thus rigidly binding the parts together, and guarding the handle from the strain to which it is subjected, substantially as herein set forth.

FREDERICK W. HAWKINS.

Witnesses:
CHAS. E. HUESTIS,
H. F. EBERTS.